No. 733,197. PATENTED JULY 7, 1903.
W. S. HARMON.
GATE.
APPLICATION FILED JAN. 27, 1903.
NO MODEL.
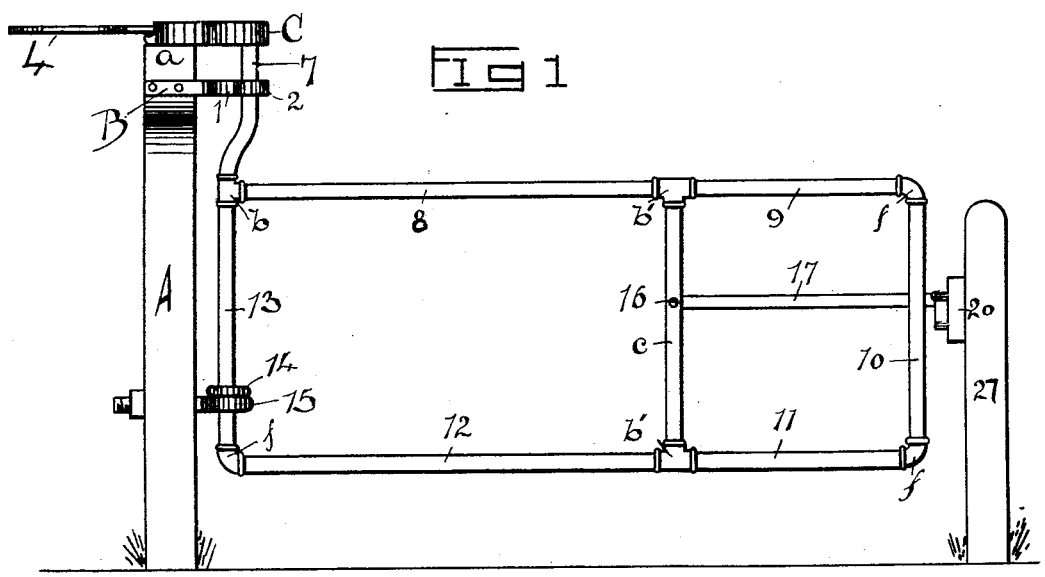
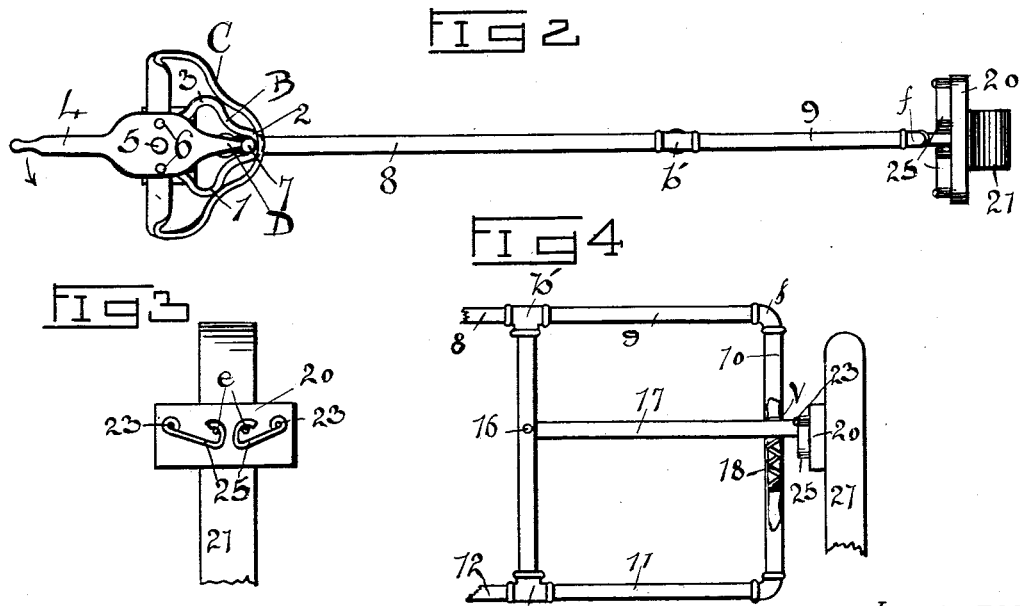
WITNESSES:
W. E. Windsor.
N. Oerman.
INVENTOR:
William S. Harmon
BY Geo. W. Sues.
Attorney
THE NORRIS PETERS CO., PHOTO-LITHO., WASHINGTON, D. C.

No. 733,197. Patented July 7, 1903.

UNITED STATES PATENT OFFICE.

WILLIAM S. HARMON, OF FREEPORT, NEBRASKA.

GATE.

SPECIFICATION forming part of Letters Patent No. 733,197, dated July 7, 1903.

Application filed January 27, 1903. Serial No. 140,695. (No model.)

*To all whom it may concern:*

Be it known that I, WILLIAM S. HARMON, residing at Freeport, in the county of Banner and State of Nebraska, have invented certain useful Improvements in Gates; and I do hereby declare that the following is a full, clear, and exact description of the invention, such as will enable others skilled in the art to which it appertains to make and use the same, reference being had to the accompanying drawings, which form a part of this specification.

This invention relates to a new and useful improvement in gates.

The aim of my invention is to provide a gate so arranged that the same may be readily opened and closed by means of a lever secured adjacently to the hinged end of the gate; and my invention embodies certain novel features hereinafter more fully described.

In the accompanying drawings I have shown in Figure 1 an elevation of the gate embodying my invention. Fig. 2 shows a top view of my invention. Fig. 3 shows an enlarged detail of the latching-ears as used in my invention, while Fig. 4 shows an enlarged detail disclosing the arrangement of the latch-bar.

In carrying out the aim of my invention I provide an ordinary gate-post A with a retaining-collar B, secured to the upper end $a$ of the gate-post. This retaining-collar B is provided with a forwardly-extending and central semicircular seating 2 and the two side seatings 1 and 3, as clearly shown in Fig. 2. Below, the gate-post A is provided with an ordinary eyebolt 15, which is adapted to receive the gate member 13, provided with a collar 14, by means of which the gate is supported, as shown in Fig. 1.

The gate proper is preferably made of ordinary gas-piping, and comprises the members 13 and 8, united by the T $b$, the member 12, secured to the member 13 by means of the elbow $f$, the intermediate member $c$, provided with the T's $b'$, and the end members 9, 10, and 11, secured by means of the elbows $f$, as shown. Extending from the upper rear T $b$ is a bent bar 7, adapted to be movably arranged within the retaining-collar B, as shown. This bent bar is normally always within one of the semicircular seatings, as shown in Fig. 2, where the bar is within the central seating 2. The forward gate member 10 is slotted to receive the latch-bar 17, pivotally supported by means of the pin 16, the spring 18 normally forcing this latch-bar 17 upward. Secured to the upper end of the post A is a pin 5, supporting the lever 4, and this lever is provided with a forwardly-extending nosing D, so arranged that when said bent bar 7 is within the central seating 2 the gate cannot be tilted backward. This is essential, that any animal in attempting to crawl below the gate may be prevented from tilting the same.

Secured to the operating-lever 4 by means of the pins 6 is a curved, preferably iron, bar C, forming a keeper, as shown in Fig. 2. This keeper is of a peculiar outline and is so arranged that when the lever $a$ is turned in the direction of the arrow the keeper will displace and carry the bent bar 7 out of the central seating 2 and force the same into the seating 3. This will cause the hinged end of the gate to be tilted at an angle and out of the perpendicular, so that the gate will assume an open position, the bent bar being held within the seating 3. To close the gate, the lever 4 will be carried backward again into its original position, so that the gate will again be tilted to assume the original closed position. Tilting the lever 4 in the direction opposite to the arrow would result in the bent bar 7 being carried into the seating 1, in which instance, however, the gate would open in a direction opposite to the direction the gate took when first operated, as described. It will be understood that the end of the lever 4 presses against the bar 7, but is not otherwise connected therewith.

In order to lock the gate, I provide an ordinary fence-post 21 with the plate 20, to which I secure the pins 23, supporting the latch-ears 25, which are supported by the pins $e$, as shown in Fig. 3. In closing the latch-bar will engage one of the ears 25 to raise the same and then be stopped by the other ear, the actuated ear again dropping into position to hold the latch-bar, as described in Fig. 1. From this it will be seen that this gate may be opened in two directions by means of a lever secured near the hinged end of the gate. This gate, however, can be operated as an ordinary gate by simply depressing the spring supporting the latch-bar 17 to carry the same below the ears 25, the gate then readily swinging open, with this advantage, however, that by virtue of the bent bar 7 when this gate is opened without the operation of lever 4 the gate in its open position will be tilted at its hinged end, so that it will close, gravitating back into its central vertical position. When, however, the gate is opened by means of the operating-lever 4, it remains in the locked open position until the lever is again actuated. By this arrangement it will be noticed that I have provided a gate very advantageous in rural districts or upon farms and in connection with fences used to inclose live stock. Now should it be desired to drive some stock through the gate the operator would open the gate by means of the lever and retain the gate in an open position. On the other hand, should an individual go through this gate he would merely operate the pivoted latch-bar, and the gate would then swing back into its closed position as soon as released, whereas when used as a stock-gate the gate remains open as long as the lever is in position.

Now, having thus described my said invention, what I claim as new, and desire to secure by United States Letters Patent, is—

1. The combination with the gate-post, provided with a suitable retaining-collar having three seatings, of a gate, said gate being hinged at its lower end to said post, a bent bar extending from said gate and held within said collar and extending beyond the same; a lever pivotally secured to said gate-post; and a curved keeper secured to said lever and being adapted to engage said bent bar, all arranged substantially as and for the purpose set forth.

2. The combination with the gate-post, of the retaining-collar secured to said gate-post provided with three seatings, a gate hinged to said post at its lower end, a bent bar extending from said gate and held within said collar and normally within one of said seatings, a lever pivoted to said post, one end of said lever engaging said bent bar while within one of said collar-seatings, and a curved keeper secured to said lever and adapted to engage said bent bar, all arranged as and for the purpose set forth.

In testimony whereof I affix my signature in presence of two witnesses.

WILLIAM S. HARMON.

Witnesses:
WILBUR E. HARMON,
HARVEY WYATT.